May 16, 1961 E. E. DOE 2,984,450
VALVE SEALS

Filed Sept. 22, 1958 2 Sheets-Sheet 1

INVENTOR
Edward E. Doe
BY
ATTORNEYS

United States Patent Office 2,984,450  
Patented May 16, 1961

2,984,450
VALVE SEALS

Edward Ernest Doe, Chesterfield, England, assignor to The Bryan Donkin Company Limited, Chesterfield, Derbyshire, England, a British company Filed Sept. 22, 1958, Ser. No. 762,345

Claims priority, application Great Britain Oct. 3, 1957

1 Claim. (Cl. 251—175)

This invention relates to valve seals of the kind which employ a sealing element auxiliary to the seal provided by the valve itself and its seating. The use of O rings as seals between movable members which are required to be in gas or liquid tight relationship is well known and the object of the present invention is to provide means which enables O rings to be used for intermittent closure with complete tightness for gases or liquids.

According to the present invention, in a valve comprising a closure member and a valve casing, the closure member or another member co-operating therewith is formed with a housing for a sealing ring such as an O ring arranged to engage a surface of the valve seating to effect a seal between the seating and the closure member, means being provided to retain the sealing ring in its housing while the valve is moved from the open to the closed position or vice versa.

In one construction of valve embodying the invention, the sealing ring is retained in its housing by a follower or keeper member disposed coaxially with the closure member and movable relatively thereto, the follower or keeper member being formed with a surface which provides a closure wall of the housing for the sealing ring.

The invention will be described in its application to a gas governor of the double beat type although the invention may be applied to other types of valves for gas, air, steam or liquids which media are intended to be embraced within the term fluid.

Alternative forms of double beat valve embodying the invention will now be described in greater detail by way of example with reference to the accompanying drawings in which.

Figure 1:
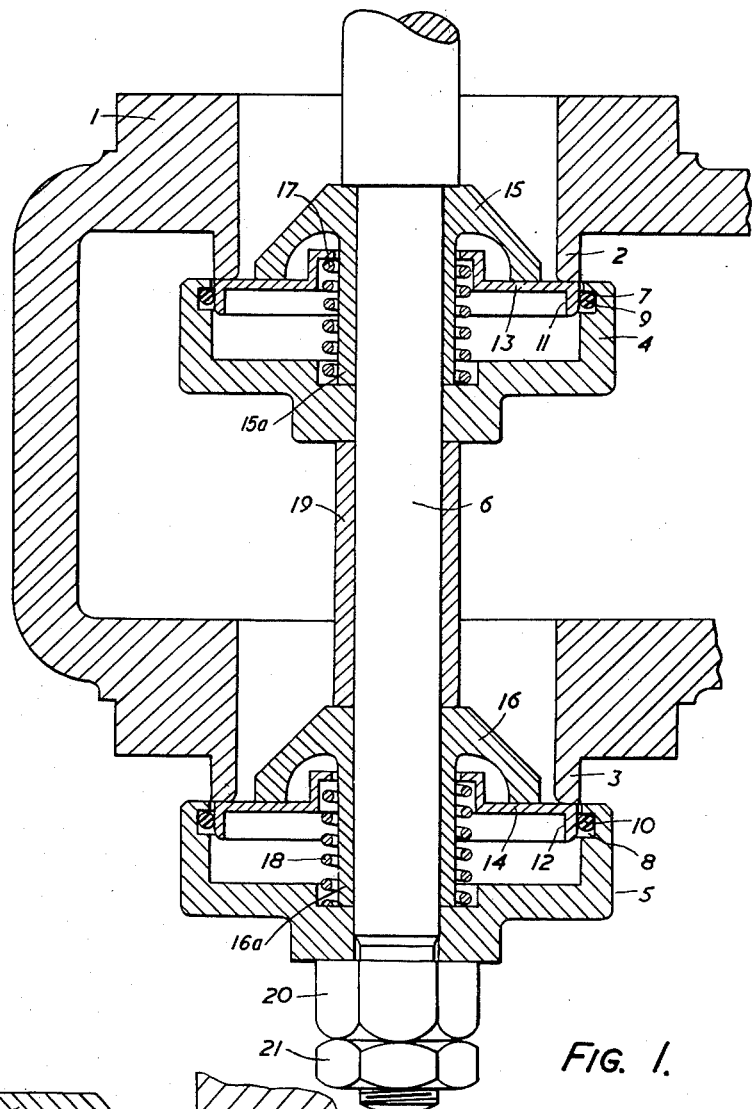
Figure 1 is an elevation in section of one such form of valve.
Figure 2:
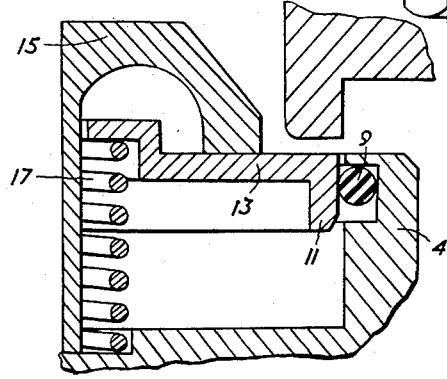
Figure 2 shows a portion of Figure 1 to an enlarged scale.

Referring to Figures 1 and 2 of the drawings, a valve body 1 is provided with seatings 2, 3 for valve closure members 4 and 5 respectively, these members being secured on a spindle 6. The valve closure members are formed with annular grooves 7, 8 which accommodate O rings 9 and 10 respectively and, in the valve position shown, the rings are retained in their housings by the turned down edges 11, 12 of follower or keeper members 13 and 14 respectively so that the O rings cannot be blown out of their grooves by the pressure of gas during the opening and closing movements. The follower members are normally urged into contact with stop members 15, 16 by helical springs 17 and 18 respectively which are housed within the space defined by their associated closure and follower members and by the sleeve portions 15a, 16a respectively of the stop members 15, 16. The springs 17 and 18 are thus partially shielded from the effect of any gaseous or liquid medium controlled by the valve. A spacing sleeve 19 is provided between the closure member 4 and the stop member 16 and the parts on the valve spindle are secured in assembled position by a nut 20 locked by another nut 21.

During closing movement of the valve, contact is first made between the follower members 13 and 14 and the lower edges of their respective seatings 2 and 3, this initial condition being that shown in Figure 1, the open or partially open position being shown in the enlarged fragmentary view in Figure 2. Continued movement of the valve to the closed position results in compression of the springs 17 and 18, the closure members 4 and 5 rising until the O rings engage the outer side walls of the seatings 2 and 3 and thereby effect a gas tight seal.

Figure 3:
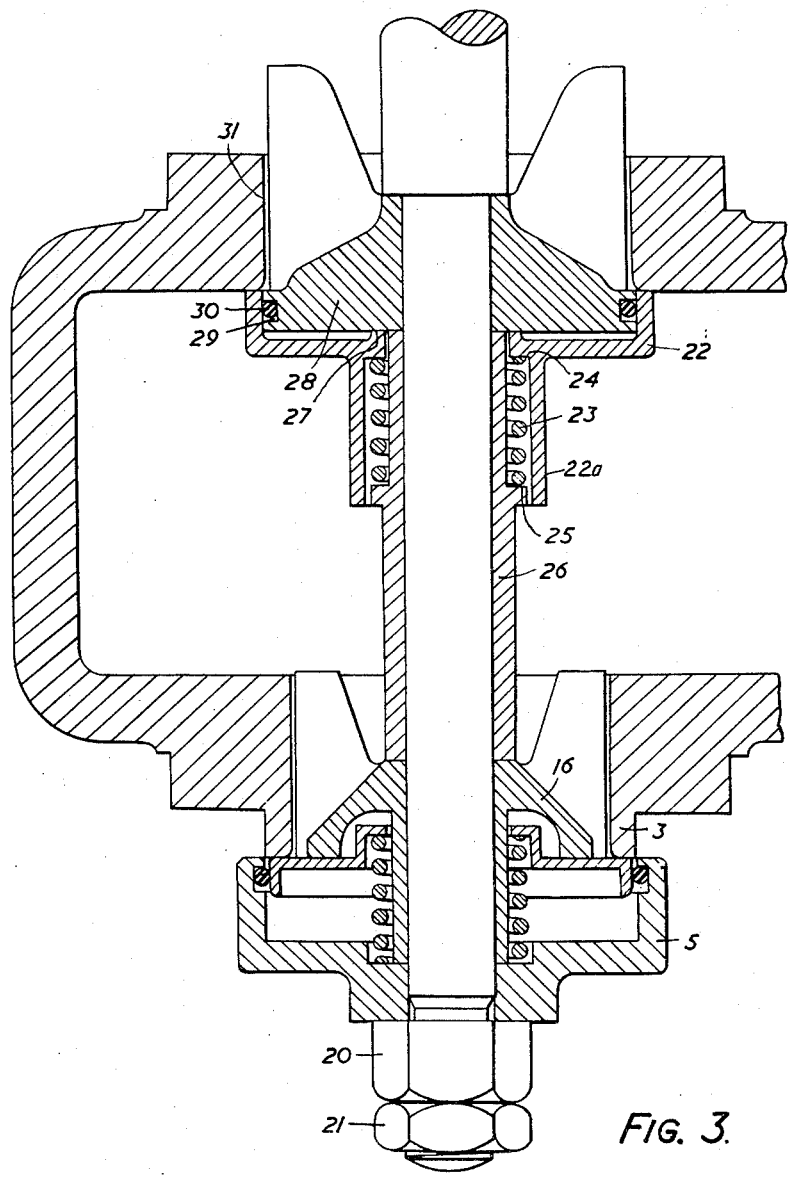
Figure 3 is an elevation in section of an alternative construction.

In an alternative construction of valve embodying the invention, as shown in Figure 3, the functions of the closure and follower members of Figure 1 are combined in a single member 22. A spring 23 is accommodated between a flange 24 on the member 22 and a shoulder 25 on the spindle 26. The spring urges an annular ridge 27 on the member 22 into contact with a member 28 which is formed with a circumferential groove 29 accommodating an O ring 30. As will be seen from the drawing, the spring 23 is enclosed between the flange 24, shoulder 25 and skirt portion 22a of the member 22. Thus the spring is shielded from the deleterious effects of any gaseous or liquid medium controlled by the valve. Final sealing of the valve in this case occurs when the member 28 rises into a position in which the O ring 30 engages the interior wall of the valve sealing 31. The lower portion of the valve is similar to that already described with reference to Figure 1 and operates in the same manner.

In the fully closed position, without any gas pressure on the sealing rings, they are squashed very slightly diametrically but the gas pressure tends to force the rings into the tops of the grooves, thus forming positive seals. The grooves are made deep enough to allow for deformation of the rings and for possible swelling of the rings.

The arrangement described ensures that the O rings will not blow out as the flow through the top valve being inwards, tends to keep the O ring in its groove, and the flow through the bottom valve being outwards again tends to keep the O ring in its groove. When the valves reopen, the follower or keeper rings are returned into their normal positions by means of the springs described.

Although reference has been made to O rings and they are shown to be of circular cross-section, any convenient form of sealing ring, not necessarily of circular cross-section may be used. Again, sealing rings additional to those shown in the drawings may be provided where desired between relatively moving parts.

I claim:

A valve assembly comprising in combination a valve seating, a valve stem, a valve closure member fixed on said valve stem, a closure member follower slidable on said valve stem, a follower stop member carried on said valve stem, a groove accommodating an O sealing ring in said closure member to effect a seal between said seating and said closure member, said follower member being formed with retaining surfaces which retain the O ring in its groove during movement of the closure member when the valve is open, said closure member, follower member and stop member in co-operation defining a space accommodating a helicoidal spring operative upon said retaining surfaces to maintain said retaining surfaces in O ring retaining position when the valve is open and in which said closure member has the shape of a circular shallow cup formed on its inner surface near its upper edge with said O ring accommodating groove, the inner diameter of the closure member is such as to provide a clearance fit over the valve seating, the follower has the shape of an inverted circular shallow cup, the outside diameter of which is equal to that of the valve seating and the outer wall of which forms said retaining surface, said follower stop member is of frusto-conical form, the base of which engages the follower, the top of the stop member engaging an abutment on said valve stem, said stop member being formed with a sleeve portion surrounding said valve stem and embraced by said helicoidal spring which is disposed between the respective bases of said closure member and said follower member.

References Cited in the file of this patent

UNITED STATES PATENTS

| | | |
|---|---|---|
| 382,469 | Hawthorn | May 8, 1888 |
| 2,583,539 | Bashark | Jan. 29, 1952 |
| 2,666,614 | Grove | Jan. 19, 1954 |
| 2,720,219 | Grove | Oct. 11, 1955 |
| 2,752,941 | Mitchell | July 3, 1956 |
| 2,772,068 | Grove | Nov. 27, 1956 |
| 2,791,238 | Bryant | May 7, 1957 |